United States Patent [19]

Westwood et al.

[11] Patent Number: 4,969,712
[45] Date of Patent: Nov. 13, 1990

[54] OPTOELECTRONIC APPARATUS AND METHOD FOR ITS FABRICATION

[75] Inventors: William D. Westwood, Nepean; Herman W. Willemsen, Stittsville; Michel I. Gallant, Nepean; Richard P. Skillen, Mississauga, all of Canada

[73] Assignee: Northern Telecom Limited, Montreal, Canada

[21] Appl. No.: 369,883

[22] Filed: Jun. 22, 1989

[51] Int. Cl.$^5$ .............. G02B 6/12; H04J 1/00; H01L 21/70; H01L 31/12

[52] U.S. Cl. .............. 350/96.11; 350/96.12; 350/96.17; 350/96.20; 350/320; 370/3; 437/23; 437/51; 437/234; 357/19; 357/30; 156/625

[58] Field of Search .............. 350/96.11, 96.12, 96.15, 350/96.13, 96.17, 96.20, 96.19, 320; 370/1, 3; 437/23, 2, 51, 38, 225, 234; 156/625; 357/16, 17, 19, 30; 250/227.11

[56] References Cited

U.S. PATENT DOCUMENTS

| | | | |
|---|---|---|---|
| 4,466,696 | 8/1984 | Carney | 350/96.20 |
| 4,725,114 | 2/1988 | Murphy | 350/96.17 |
| 4,760,569 | 7/1988 | Mahlein | 370/3 |
| 4,847,665 | 7/1989 | Mand | 357/16 |
| 4,897,711 | 1/1990 | Blonder et al. | 350/96.17 X |
| 4,904,036 | 2/1990 | Blonder | 350/96.11 |
| 4,916,497 | 4/1990 | Gaul et al. | 350/96.17 |

FOREIGN PATENT DOCUMENTS 0187581 7/1986 European Pat. Off. ..... 350/96.11 X

OTHER PUBLICATIONS

"GaInAsP/InP Lasers with Etched Mirrors by Reactive Ion Etching Using a Mixture of Ethane and Hydrogen", Matsui et al., Appl. Phys. Lett. 54 (13), 27 Mar. 1989.

Primary Examiner—Brian Healy
Attorney, Agent, or Firm—C. W. Junkin

[57] ABSTRACT

An edge emitting optoelectronic source is integrally formed on a surface of a semiconductor substrate. An optical waveguide is integrally formed on the same surface of the substrate adjacent to the source. The waveguide is aligned with the source for optical coupling of the source to the waveguide. The waveguide comprises an optical diverter for diverting at least a portion of any light propagating along the waveguide toward the source through a surface of the waveguide. An optoelectronic detector is secured to that surface of the waveguide through which light is diverted for receiving light diverted through that surface. The resulting optoelectronic apparatus is suitable for launching and detecting optical signals in large volume bidirectional optical fiber transmission systems.

19 Claims, 2 Drawing Sheets

OPTOELECTRONIC APPARATUS AND METHOD FOR ITS FABRICATION

FIELD OF THE INVENTION

This invention relates to optoelectronic apparatus and methods for its fabrication.

BACKGROUND OF THE INVENTION

Bidirectional optical fiber telecommunications systems for subscriber loop applications require low cost terminals for use at the subscriber's premises. Such terminals must include an optoelectronic detector for converting incoming optical signals to electrical signals, an optelectronic source for converting electrical signals to outgoing optical signals, and an optical coupling arrangement for coupling incoming optical signals from a transmission fiber to the optoelectronic detector and for coupling outgoing optical signals from the optoelectronic source to the transmission fiber. The detector, source, coupling arrangement, and transmission fiber must form an assembly which provides efficient optical coupling between the transmission fiber and the detector and efficient optical coupling between the source and the transmission fiber while avoiding direct optical coupling between the source and the detector. The assembly must be compact, rugged and inexpensive to manufacture in large volumes.

Conventional bidirectional optical fiber telecommunications systems employ discrete detectors, sources and coupling arrangements which are assembled together. The assembly procedure is time consuming and requires highly skilled labour to achieve the coupling requirements. Moreover, the resulting assembly is somewhat larger and more expensive than desired for large volume applications.

U.S. patent application Ser. No. 176,120 filed Mar. 31, 1988, now U.S. Pat. No. 4,847,665, in the name of Ranjit S. Mand suggests that optoelectronic sources, optoelectronic detectors and interconnecting waveguides can be monolithically integrated on a common semiconductor substrate. However, this application discloses no optical coupling arrangement suitable for bidirectional optical transmission. Moreover, the monolithic integration of the optoelectronic sources and detectors imposes certain constraints on the source and detector structures.

In a design proposed by Photonic Integration Research Inc. (PIRI), silica waveguides and locating structures are photolithographically defined on the surface of a silicon substrate. A laser diode is formed on a separate semiconductor substrate, cleaved from that substrate and secured to the surface on the silicon substrate in alignment with one of the silica waveguides to optically couple the laser diode to the waveguide. Dichroic filters are formed on a separate glass substrate, cleaved from that substrate and secured to the silicon substrate between locating structures where they act as wavelength selective beam splitters to divert light of a particular wavelength from one waveguide section to another waveguide section. Mirrors are formed on a beveled edge of a separate glass substrate, cleaved from that substrate and secured to the silicon substrate between locating structures where they deflect light propagating along a waveguide section away from the surface of the silicon substrate. Avalanche photodiodes (APDs) are formed on a separate substrate, cleaved from that substrate and secured to locating structures over the mirrors to receive light deflected by the mirrors. This design requires the separate formation of the laser diode, the dichroic filters, the mirrors, the APDs and the silicon substrate including its integral waveguides and locating structures. The laser diode, dichroic filters, mirrors and APDs must then be cleaved, carefully aligned with appropriate locating structures on the silicon substrate and secured to the silicon substrate in their aligned positions. While this procedure provides a compact structure, much precise manipulation of very small structures is required to align the laser diode, dichroic filters, mirrors and APDs and to secure them to the silicon substrate. The alignment and securing of the laser diode is particularly critical and difficult to perform accurately and reliably.

SUMMARY OF THE INVENTION

This invention seeks to obviate or mitigate the problems discussed above. More particularly, this invention seeks to provide optoelectronic apparatus for bidirectional optical transmission systems which is easier to assemble than the PIRI design discussed above and which offers a more flexible choice of optoelectronic source and detector structures than the monolithically integrated structures of Mand.

To this end, one aspect of the invention provides optoelectronic apparatus comprising a semiconductor substrate, an edge emitting optoelectronic source which is formed integrally on a surface of the substrate, and an optical waveguide which is formed integrally on that surface of the substrate adjacent to the source. The waveguide is aligned with the source for optical coupling of the source to the waveguide. The waveguide comprises an optical diverter for diverting at least a portion of any light propagating along the waveguide toward the source through a surface of the waveguide. The apparatus further comprises an optoelectronic detector which is secured to that surface of the waveguide through which light is diverted for receiving light diverted through that surface.

Another aspect of the invention comprises a method for making optoelectronic apparatus. The method comprises integrally forming an edge emitting optoelectronic source on a surface of a semiconductor substrate and integrally forming an optical waveguide on that surface of the substrate adjacent to the source. The waveguide is aligned with the source for optical coupling of the source to the waveguide. The waveguide comprises an optical diverter for diverting at least a portion of any light propagating along the waveguide toward the source through a surface of the waveguide. The method further comprises securing an optoelectronic detector to that surface of the waveguide through which light is diverted for receiving light diverted through that surface.

The inventive optoelectronic apparatus is easier to manufacture than the optoelectronic apparatus proposed by PIRI because the source and the waveguide are integrally formed on a common substrate. Thus, for example, the waveguide and source can be accurately aligned by a coordinated series of photolithographic operations which are easier to perform than the micromanipulation and cementing operations required for the alignment of the source to the waveguide in the assembly of the PIRI apparatus. Moreover, because the source and detector are formed on separate substrates in the inventive method and apparatus, the inventive method and apparatus are compatible with a greater variety of source and detector structures than the optoelectronic apparatus proposed by Mand.

In the inventive apparatus, the diverter may comprise a beam splitter which is oriented so as to reflect some light propagating along the waveguide toward the source through the surface of the waveguide to the detector while transmitting some light propagating along the waveguide away from the source. The beam splitter may be planar and may be oriented so as to reflect light along a path which is perpendicular to the surface of substrate. The beam splitter may be wavelength selective so as to preferentially transmit light at wavelengths emitted by the source.

Alternatively, the diverter may comprise a beam splitter, a waveguide section which is aligned with the beam splitter for guiding light which is reflected by the beam splitter, and a reflector for reflecting the guided light through the surface of the waveguide to the detector. In this case, the reflector may be planar and may be oriented so as to reflect light along a path which is perpendicular to the surface of the substrate. The beam splitter may be wavelength selective and may preferentially transmit light at wavelengths emitted by the source. The waveguide section may include a wavelength selective filter between the beam splitter and the reflector which preferentially prevents transmission of light at wavelengths emitted by the source from the beam splitter to the reflector.

Alternatively, the diverter may comprise a directional coupler having a first branch which is optically coupled to the source and a second branch which is optically coupled to the detector, and a reflector extending across the second branch and oriented for reflecting light propagating along the second branch through the surface of the waveguide to the detector.

In the inventive method, the optical waveguide may be integrally formed on the substrate by forming a lower cladding layer on the substrate, forming a first guiding layer on the lower cladding layer, forming a partially reflecting interface at a planar end surface of the first guiding layer, forming a second guiding layer which is contiguous with the first guiding layer at the partially reflecting interface, and forming an upper cladding layer on the first and second guiding layers. The partially reflecting interface may be formed by depositing a multilayer coating on the end surface of the first waveguide section to define a dichroic filter.

Integral formation of the optical waveguide on the substrate may also comprise forming a reflector support structure having a sloped planar surface, forming a reflecting interface at the planar surface, and forming a waveguide section which is contiguous with the planar surface. The planar surface and the reflecting interface are then oriented so as to reflect light propagating along the waveguide section through a surface of the waveguide section. The reflecting interface may be formed by depositing a reflective coating on the planar surface.

BRIEF DESCRIPTION OF THE DRAWINGS

Embodiments of the invention are described below by way of example only with reference to the accompanying drawings in which.

DESCRIPTION OF EMBODIMENTS

Figure 1:
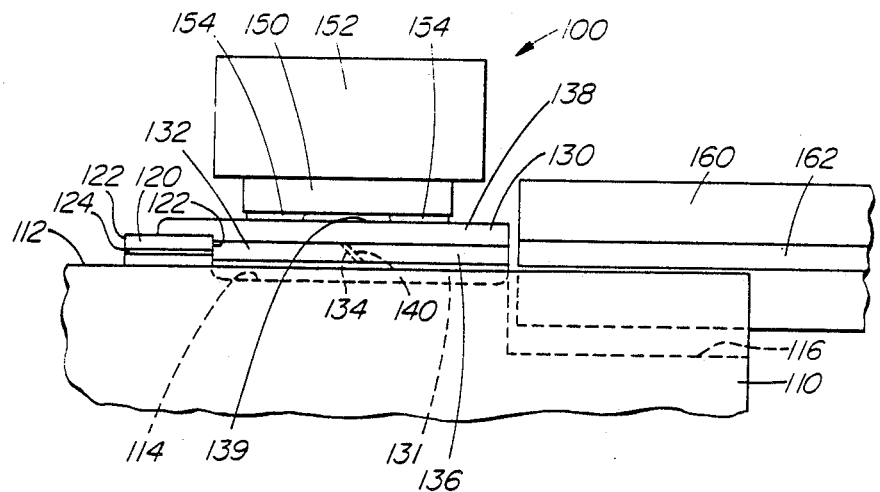
FIG. 1 is a side elevational view of optoelectronic apparatus according to a first embodiment.

FIG. 1 illustrates optoelectronic apparatus 100 according to a first embodiment. The apparatus 100 comprises an InP substrate 110 and an edge emitting InGaAsP/InP ridge waveguide laser source 120 on an upper surface 112 of the substrate 110. The ridge waveguide laser 120 is formed integrally on the upper surface 112 of the substrate 110 by semiconductor processing techniques which are conventionally used to form such lasers, except that facets 122 of the laser 120 are formed by reactive ion etching (RIE) rather than by cleaving. Suitable RIE techniques are taught in Matsui et al, Appl. Phys. Lett 54 (13), Mar. 27, 1989. The conventional semiconductor laser processing techniques include a series of coordinated photolithographic operations. The laser 120 has an active layer 124 from which light is emitted.

The upper surface 112 of the substrate 110 is etched to define a recessed region 114 which is aligned with the laser 120 and a v-groove 116 which is aligned with the recessed region 114 and the laser 120. The v-groove has an apex angle of approximately 55 degrees, and depth of approximately 75 microns.

The apparatus 100 further comprises an optical waveguide 130 which is formed integrally on the upper surface 112 of the substrate 110. The waveguide 130 is formed on the recessed region 114 of the surface 112 adjacent to the laser 120 to ensure that a guiding layer 132 of the waveguide 130 is vertically aligned with the active layer 124 of the laser 120 for optical coupling of the laser 120 to the waveguide 130.

The waveguide 130 is formed by depositing and photolithographically defining a series of layers of acrylic polymer as will be described in greater detail below. Suitable acrylic materials are produced by Raychem Corporation of Menlo Park, California, and other organic polymer materials are available from Norland Products Inc. of North Brunswick, N.J. Acrylic polymer materials having a refractive index of approximately 1.5 are used for upper and lower cladding layers 131, 138 of the waveguide 130, and acrylic polymer materials having a refractive index which exceeds the refractive index of the cladding layers 131, 138 by approximately 0.005 are used for first and second guiding layers 132, 136 of the waveguide 130. The acrylic materials are spun on, cured with ultraviolet light and masked with a metal layer which is defined using conventional photolithographic techniques. The masked acrylic layer is then defined by oxygen plasma etching through openings in the metal layer, and the metal layer is removed.

The lower cladding layer 131 is deposited to a thickness of approximately 20 microns on the recessed region 114 of the substrate surface 112. The first guiding layer 132 is deposited to a thickness of approximately 8 microns on the lower cladding layer 131 and photolithographically patterned to define a stripe approximately 8 microns wide. An end portion of the first guiding layer 132 is anisotropically etched in an oxygen ion beam directed at a 45 degree angle to the surface 112 of the substrate 110 to form a planar end surface 134 which has a 45 degree slope with respect to the surface 112 of the substrate 110.

A partially reflecting interface is formed at the sloped end surface 134 of the guiding layer 132 by depositing a partially reflective coating 140 on the end surface 134. The coating 140 is a 30 nm thick Cr/Au/Cr coating which is deposited by sputtering.

A second guiding layer 136 is then deposited on the lower cladding layer 131 to the same thickness as the first guiding layer 132. The second guiding layer 136 is contiguous with the first guiding layer 132 at the partially reflecting coating 140, and is photolithographically patterned to define an 8 micron wide stripe which is aligned with the stripe defined by the first guiding layer 132. An upper cladding layer 138 is then deposited to a thickness of approximately 20 microns over the first and second guiding layers 132, 136 and over peripheral portions of the lower cladding layer 131, so that the guiding layers 132, 136 are surrounded by the cladding layers 131, 138.

The apparatus 100 further comprises a PIN photodiode detector 150 which is integrally formed on a separate substrate 152 and placed face down on an upper surface 139 of the waveguide over the multilayer coating 140 by micromanipulation. The PIN detector 150 is secured to the upper surface 132 of the waveguide 130 by transparent epoxy 154.

A single mode optical fiber 160 having an outer diameter of approximately 125 microns and a core diameter of approximately 8 microns is positioned in the v-groove 116 by micromanipulation and secured in the v-groove 116 by epoxy. The depth of the v-groove 116 is such as to ensure vertical alignment of a core 162 of the optical fiber 160 with the second guiding layer 136 for efficient optical coupling between the waveguide 130 and the optical fiber 160.

In operation of the apparatus 100, an optical signal emitted by the laser 120 is coupled into the first guiding layer 132 of the optical waveguide 130 and onto the coating 140. The coating 140 acts as a beam splitter, diverting part of the optical signal and transmitting part of the optical signal into the second guiding layer 136 from which it is coupled into the core 162 of the optical fiber 160 for transmission to a remote receiver. An optical signal propagating down the fiber core 162 toward the apparatus 100 is coupled from the fiber core 162 to the second guiding layer 136 and onto the coating 140. The coating 140 acts as a beam splitter, transmitting part of the optical signal and diverting part of the optical signal through the upper surface 139 of the waveguide 130 to the PIN detector 150. Thus, the apparatus 100 couples outgoing optical signals from the laser 120 to the optical fiber 160 and couples incoming optical signals from the optical fiber 160 to the PIN detector 150.

Because the coating 140 is partially transmitting and partially reflecting, it diverts some of the outgoing optical signal from the optical fiber 160, and it fails to divert all of the incoming optical signal to the detector 150. The coating 140 can be made more transmissive to improve the coupling efficiency for outgoing optical signals, but this will reduce the coupling efficiency for incoming optical signals. Similarly, the coating 140 can be made more reflective to improve the coupling efficiency for incoming optical signals, but this will reduce the coupling efficiency for outgoing optical signals. However, if the incoming and outgoing optical signals are at different wavelengths, the coating 140 can be made wavelength selective to preferentially transmit optical signals at wavelengths emitted by the laser 120 and to preferentially reflect optical signals at wavelengths selected for incoming optical signals, thereby improving the coupling efficiency for both incoming and outgoing optical signals. A suitable multilayer wavelength selective coating can be designed using conventional multilayer filter design techniques and deposited on the end surface 134 of the first guiding layer 132 using directional deposition techniques such a Electron Cyclotron Resonance (ECR) deposition.

A metal coating may be provided on the upper surface 139 of the waveguide 130 to reduce the coupling of stray light to the PIN detector 150. An opening must be provided in this coating above the coated end surface partially reflective coating 140 to permit the coupling of incoming optical signals to the detector 150. Where distinct wavelengths are used for incoming and outgoing optical signals, a wavelength selective coating may be applied to the upper surface 139 of the waveguide 130 or to the PIN detector 150 to reduce unwanted coupling of light from the laser 120 to the PIN detector 150.

Figure 2:
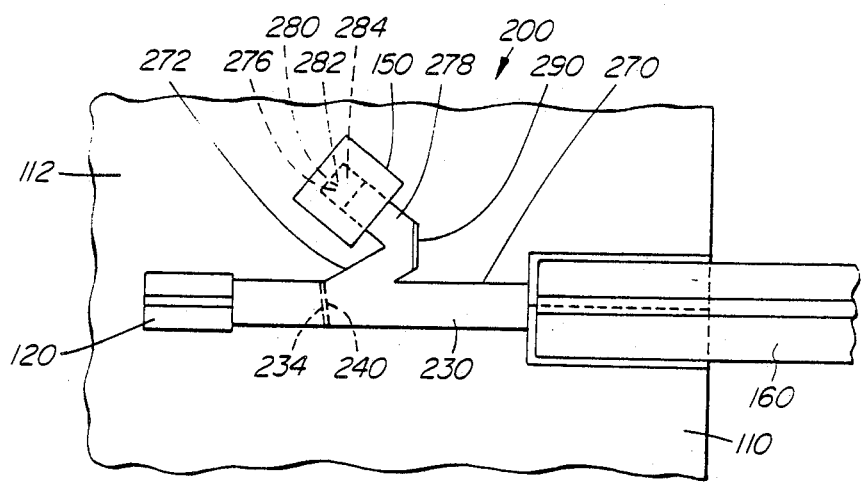
FIG. 2 is a plan view of optoelectronic apparatus according to a second embodiment.

FIG. 2 illustrates optoelectronic apparatus 200 according to a second embodiment. The apparatus 200 is similar to the apparatus 100 according to the first embodiment, except that the waveguide 130 is replaced with a waveguide 270 of a different configuration.

In particular, the waveguide 270 comprises a first waveguide section 230 which is similar to the waveguide 130 of the apparatus 100, except that the planar end surface 234 of the first guiding layer 232 and the wavelength selective coating 240 which it supports are oriented to reflect light in a path which is parallel to the surface 112 of the substrate 110 instead of perpendicular to that surface. The waveguide 270 further comprises a second waveguide section 272 which branches off the first waveguide section 230 near the wavelength selective coating 240 and which is oriented so that the wavelength selective coating 240 diverts incoming optical signals into the second waveguide section 272. The second waveguide section 272 has a layer structure which is identical to the layer structure of the first waveguide section 230. Cladding layers of the second waveguide section 272 are deposited and patterned together with cladding layers of the first waveguide section 230, and a guiding layer 274 of the second waveguide section 272 is deposited and patterned together with a second guiding layer 236 of the first waveguide section 230.

The second waveguide section 270 also includes a reflector 276 which is sloped at a 45 degree angle so as to couple optical signals from the second waveguide section 270 to the PIN detector 150 which is secured to an upper surface 278 of the second waveguide section 270. The reflector 276 is made by forming a reflector support structure 280, anisotropically etching the reflector support structure to provide a sloped planar end surface 282 and depositing a reflective metallic coating 284 on the end surface 282. The reflector support structure 280 may be deposited and patterned together with a first guiding layer 232 of the first waveguide section 230. The rest of the second waveguide section 280 is then formed so as to be contiguous with the planar end surface 282 which supports the reflective coating 284.

The second waveguide section 270 further comprises a deposited wavelength selective reflection filter 290 which is located between the beam splitting coating 240 and the reflector 276 to preferentially prevent transmission of light at wavelengths emitted by the laser 120 from the beam splitting coating 240 to the reflector 276.

In operation of the apparatus 200, the waveguide 270 couples outgoing optical signals from the laser 120 to the optical fiber 160 via the first waveguide section 230. Incoming optical signals are coupled from the optical fiber 160 to the first waveguide section 230, and diverted from the first waveguide section 230 to the detector 150 by the wavelength selective coating 240. The wavelength selective filter 290 improves the isolation between the laser 120 and the PIN detector 150, and may not be essential for all applications.

Figure 3:
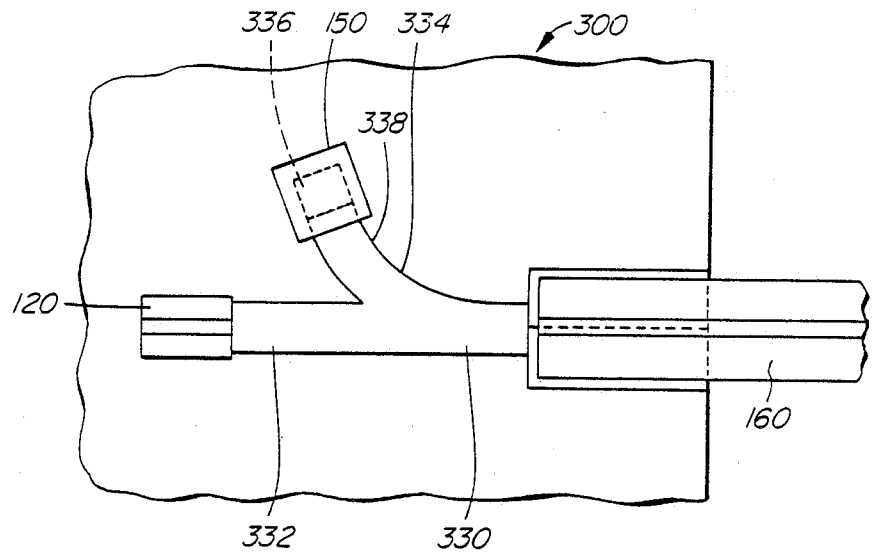
FIG. 3 is a plan view of optoelectronic apparatus according to a third embodiment.

FIG. 3 illustrates optoelectronic apparatus 300 according to a third embodiment. The apparatus 300 is similar to the apparatus 100, 200 according to the first and second embodiments, except that the waveguides 130, 270 are replaced with a waveguide 330 of a different configuration. In particular, the waveguide 330 comprises a y-splitter which has a first branch 332 which is optically coupled to the laser 120, and a second branch 334 which is optically coupled to the PIN detector 150. The second branch 334 includes a reflector 336 similar to the reflector 276 of the second embodiment 200. The waveguide 330 has a layer structure which is similar to the layer structure of the waveguides 130, 270 of the other embodiments.

In operation of the apparatus 300, the waveguide 330 couples outgoing optical signals from the laser 120 directly to the optical fiber 160 via the first branch 332 of the waveguide 330, and couples a portion of incoming optical signals to the second branch 334 of the waveguide 330. The reflector 334 reflects optical signals propagating along the second branch 334 through an upper surface 338 of the waveguide 330 to the PIN detector 150.

Figure 4:
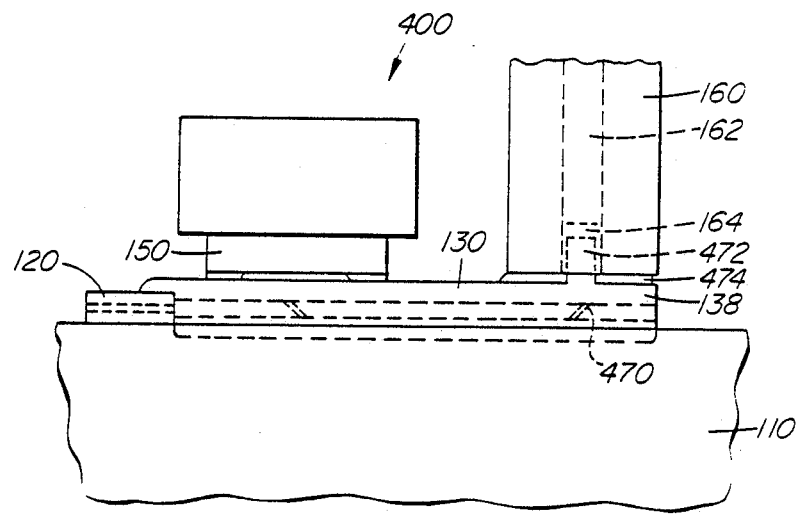
FIG. 4 is a side elevational view of optoelectronic apparatus according to a fourth embodiment.

FIG. 4 illustrates optoelectronic apparatus according to a fourth embodiment. This apparatus 400 is identical to the apparatus 100 according to the first embodiment, except that the optical waveguide 130 is modified to provide for an alternative fiber coupling arrangement. In particular, a reflector 470 similar to the reflectors 276, 336 of the second and third embodiments is incorporated in the waveguide 130, and a stub 472 approximately 8 microns in diameter is photolithographically defined in the upper cladding layer 138 over the reflector 470. The core 162 of the optical fiber 160 is preferentially etched in hydrofluoric acid to define a recess 164 into which the stub 472 is inserted to align the fiber core 162 with the reflector 470. The optical fiber 160 is fixed in place with transparent epoxy 474.

In an alternative fiber coupling arrangement, the cladding of the optical fiber 160 may be preferentially etched so that a portion of the fiber core 162 protrudes beyond the cladding, and a recess having a diameter approximately equal to the outer diameter of the protruding core may be photolithographically defined in the upper cladding layer 138 over the reflector 470 so that insertion of the protruding core into the recess couples the optical fiber 160 to the waveguide 130 via the reflector 470. Alternatively, the fiber etching step may be omitted and a recess having an inner diameter approximately equal to the outer diameter of the optical fiber 160 may be provided over the reflector 470 for alignment of the fiber with the reflector 470. Other fiber alignment arrangements may also be used to align the fiber with the optical waveguide. For example, many known fiber alignment arrangements are integrated with the package which houses the substrate instead of being integrated with the substrate itself.

In each of the above embodiments, the waveguide layers may be any suitable low loss dielectric such as silicon dioxide, silicon nitride, polyimide or acrylic. Inorganic dielectrics may be deposited by any suitable low temperature deposition process such as sputtering or Plasma Enhanced Chemical Vapour Deposition (PECVD). Organic dielectrics may be deposited by spinning, spraying or dipping followed by curing. The dielectric layers may be patterned by laser ablation, Reactive Ion Etching (RIE) or wet etching techniques. The dielectrics must be selected so that the guiding layers have a higher refractive index than the cladding layers. In the case of silicon dioxide waveguide layers, the guiding layers may be doped with an index-raising dopant such as germanium or various metallic oxides to raise their refractive index above that of the cladding layers, or the cladding layers may be doped with an index-lowering dopant such as fluorine or boron to lower their refractive index below that of the guiding layers. A greater difference between the refractive index of the guiding layers and the refractive index of the cladding layers could permit the use of thinner guiding and cladding layers, although the impact of thinner layers on optical coupling efficiency would require consideration.

The sloping planar surfaces 134, 282 may be formed by ion milling with a suitably oriented ion beam, anisotropic etching with a masking material and etching parameters selected for suitable slope control or by laser ablation with a suitably oriented laser beam.

These and other modifications to the embodiments described above are within the scope of the invention as claimed below.

We claim:

1. Optoelectronic apparatus comprising:
 a semiconductor substrate;
 an edge emitting optoelectronic source formed integrally on a surface of the substrate;
 an optical waveguide formed integrally on said surface of the substrate adjacent to and aligned with the source for optical coupling of the source to the waveguide, the waveguide comprising a partially reflecting mirror oriented so as to reflect at least a portion of any light propagating along the waveguide toward the source through a surface of the waveguide; and
 an optoelectronic detector secured to said surface of the waveguide for receiving light reflected through said surface.

2. Optoelectronic apparatus as defined in claim 1, wherein the mirror is planar and is oriented so as to reflect light in a path which is perpendicular to the surface of the substrate.

3. Optoelectronic apparatus as defined in claim 1, wherein the mirror is wavelength selective and preferentially transmits light at wavelengths emitted by the source.

4. Optoelectronic apparatus comprising:
 a semiconductor substrate;
 an edge emitting optoelectronic source formed integrally on a surface of the substrate;
 an optical waveguide formed integrally on said surface of the substrate adjacent to and aligned with the source for optical coupling of the source to the waveguide, the waveguide comprising a beam splitter for reflecting at least a portion of any light propagating along the waveguide toward the source, a waveguide section adjacent to and aligned with the beam splitter for guiding light reflected by the beam splitter, and a reflector for reflecting the guided light through a surface of the waveguide; and an optoelectronic detector secured to said surface of the waveguide for receiving light reflected through said surface.

5. Optoelectronic apparatus as defined in claim 4 wherein the reflector is planar and is oriented so as to reflect light in a path which is perpendicular to the surface of the substrate.

6. Optoelectronic apparatus as defined in claim 4, wherein the beam splitter is wavelength selective and preferentially transmits light at wavelengths emitted by the source.

7. Optoelectronic apparatus as defined in claim 6, wherein the waveguide section comprises a wavelength selective filter between the beam splitter and the reflector which preferentially prevents transmission of light at wavelengths emitted by the source from the beam splitter to the reflector.

8. Optoelectronic apparatus comprising:
a semiconductor substrate;
an edge emitting optoelectronic source formed integrally on a surface of the substrate;
an optical waveguide formed integrally on said surface of the substrate adjacent to and aligned with the source for optical coupling of the source to the waveguide, the waveguide comprising a a directional coupler having a first branch optically coupled to the source and a second branch for diverting at least a portion of any light propagating along the waveguide toward the source, and a reflector extending across the second branch and oriented for reflecting light propagating along the second branch through a surface of the waveguide; and
an optoelectronic detector secured to said surface of the waveguide for receiving light reflected through said surface.

9. Optoelectronic apparatus as defined in claim 1, further comprising a v-groove in the surface of the substrate in alignment with the waveguide for receiving an optical fiber.

10. Optoelectronic apparatus comprising:
a semiconductor substrate;
an edge emitting optoelectronic source formed integrally on a surface of the substrate;
an optical waveguide formed integrally on said surface of the substrate adjacent to and aligned with the source for optical coupling of the source to the waveguide, the waveguide comprising an optical diverter for diverting at least a portion of any light propagating along the waveguide toward the source through a surface of the waveguide, a reflector oriented to reflect light propagating along the waveguide into a path which is perpendicular to the surface of the substrate and a fiber alignment feature located over the reflector; and
an optoelectronic detector secured to said surface of the waveguide for receiving light diverted through said surface.

11. Optoelectronic apparatus as defined in claim 10, wherein the fiber alignment feature comprises a stub for insertion into a complementary recess of a fiber.

12. Optoelectronic apparatus as defined in claim 10, wherein the fiber alignment feature comprises a recess for receiving a complementary portion of a fiber.

13. A method for making optoelectronic apparatus, comprising:
integrally forming an edge emitting optoelectronic source on a surface of a semiconductor substrate;
integrally forming an optical waveguide on said surface of the substrate adjacent to and aligned with the source for optical coupling of the source to the waveguide, the waveguide comprising an optical diverter for diverting at least a portion of any light propagating along the waveguide toward the source through a surface of the waveguide by:
forming a lower cladding layer on the substrate;
forming a first guiding layer on the lower cladding layer;
forming a partially reflecting interface at a planar end surface of the first guiding layer;
forming a second guiding layer which is contiguous with the first guiding layer at the partially reflecting interface; and
forming an upper cladding layer on the first and second guide layers; and
securing an optoelectronic detector to said surface of the waveguide for receiving light diverted through said surface.

14. A method as defined in claim 13, wherein the step of forming a partially reflecting interface comprises depositing a multilayer coating on the end surface of the first waveguide section to define a dichroic filter.

15. A method as defined in claim 13, wherein the step of integrally forming a waveguide comprises:
forming a reflector support structure having a sloped planar surface;
forming a reflecting interface at the planar surface; and
forming a waveguide section which is contiguous with the planar surface.

16. A method as defined in claim 15, wherein the step of forming a reflecting interface comprises depositing a reflective coating on the planar surface.

17. A method as defined in claim 13, wherein the steps of integrally forming the optoelectronic source and integrally forming an optical waveguide comprise a coordinated series of photolithographic operations.

18. A method as defined in claim 13, further comprising etching a v-groove in the surface of the substrate adjacent to and aligned with the optical waveguide and securing an optical fiber in the v-groove to optically couple the optical fiber to the waveguide.

19. A method as defined in claim 13, wherein the step of forming an optical waveguide comprises:
forming a reflector in the waveguide which is oriented so as to reflect light propagating along the waveguide into a path which is perpendicular to the surface of the substrate; and
forming a fiber location feature in the waveguide over the reflector;
the method further comprising:
forming a feature complementary to the fiber location feature in an end face of an optical fiber; and
mating the fiber location feature with the complementary end face of the optical fiber to align the optical fiber with the reflector.

* * * * *